No. 854,089. PATENTED MAY 21, 1907.
J. R. HAMILTON.
WIRE STRETCHER.
APPLICATION FILED FEB. 13, 1907.
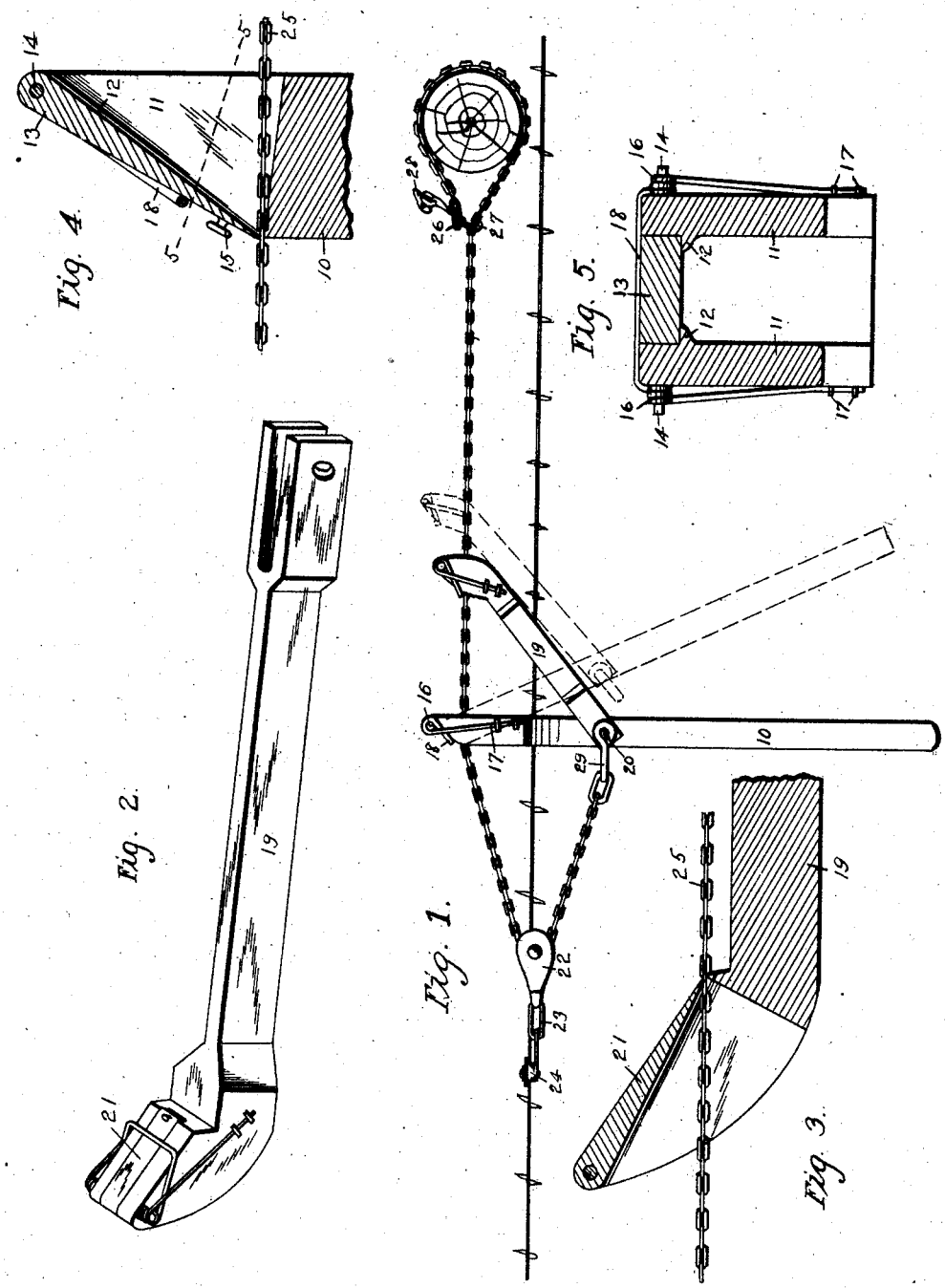
Witnesses.
F. C. Dahlberg.
N. E. Bennett.
Inventor.
J. R. Hamilton.
by Orwig & Lane Atty.s

UNITED STATES PATENT OFFICE.

JOHN R. HAMILTON, OF AUBURN, IOWA.

WIRE-STRETCHER.

No. 854,089.  Specification of Letters Patent.  Patented May 21, 1907.

Application filed February 13, 1907. Serial No. 357,128.

*To all whom it may concern:*

Be it known that I, JOHN R. HAMILTON, a citizen of the United States, residing at Auburn, in the county of Sac and State of Iowa, have invented a certain new and useful Wire-Stretcher, of which the following is a specification.

The object of my invention is to provide a wire stretcher of simple, durable and inexpensive construction especially adapted for use in stretching wire comparatively long distances and so designed that the wire clutching device might be attached to the wire only once and then the wire may be stretched as far as desired without having the wire clutching device take a new hold on the wire.

A further object is to provide a device of this kind that will work equally well as a wire splicer.

My invention consists in the construction, arrangement and combination of the various parts of the device, whereby the objects contemplated are attained, as hereinafter more fully set forth, pointed out in my claims and illustrated in the accompanying drawings, in which—

Figure 1 shows a plan view of the device as applied to a post and the fence wire. Fig. 2 shows an enlarged, detail, perspective view of the pivoted arm. Fig. 3 shows a sectional view of the end of the pivoted arm in which the chain gripping device is attached, said view also shows a chain in the gripping device of said arm. Fig. 4 shows a detail, sectional view of the chain gripping device at the end of the main lever with a chain in position therein, and Fig. 5 shows a detail, sectional view on the line 5—5 of Fig. 4.

Referring to the accompanying drawings, I have used the reference numeral 10 to indicate the main lever. One end of said lever is provided with two side extensions 11 having shoulders 12 thereon. At the outer end of the extensions is a chain gripping pawl 13 pivotally connected to the pin 14 and provided with a knob or handle 15. Its free end is designed to stand close to the end of the lever between the extended sides 11. The said shoulders 12 serve to support said chain gripping pawl against movement inwardly toward the center of the extension sides 11.

I have provided for yieldingly holding the free end of the pawl toward the body portion of the lever 10 as follows: On the ends of the pin 14 is a coil spring 16, the ends of which are attached at 17 to the outer faces of the extension sides 11 and the central portion of the spring is formed into a loop 18 to engage the outer face of the chain gripping pawl.

A chain gripping arm 19 is pivotally connected at 20 to the lever 10 and is provided with a spring actuated chain gripping pawl 21 similar to the chain gripping pawl before described.

The reference numeral 22 indicates a pulley of ordinary construction and connected with this pulley, by a link 23, is a wire gripping device 24 of the ordinary kind.

A chain 25 is provided having at one end a link 26 to which a hook 27 is attached and also a wire gripping device 28 of the ordinary kind. This chain is extended first through the extension sides of the chain gripping arm 19, then through the extension sides of the chain gripping lever 10, then around the pulley 22 and its other end is attached to a loop 29 connected to the pin which pivots the arm 19 to the lever 10.

In practical use and assuming that it is desired to stretch a wire toward a post, the operator passes one end of the chain around the post and connects the hook 27 with the chain. He then places the wire gripping device 24 in engagement with the wire. He then reciprocates the lever 10. When the free end of said lever is moved toward the right, as shown by dotted lines in Fig. 1, the chain gripping pawl 21 of the arm 19 freely slides over the chain toward the post and grips the chain at a new place. Then when the lever 10 is moved toward the left, the chain gripping pawl 13 freely slides over the chain and grips the chain at a new place. The chain is made long enough to stretch the wire as far as may be desired without ever releasing the gripping device 24 from the wire. This makes the device of great convenience is stretching barbed wire as it is difficult and dangerous to readjust wire gripping devices on a barbed wire after the wire has been partly stretched.

Assuming that it is desired to splice wire, the operator places the wire gripping device 28 in engagement with one end of the wire to be spliced and proceeds the same as before described, and thus draws the ends of the wire together so that they may be spliced. The chain may readily be moved through the chain gripping portion 13 and 21 by the operator grasping the knobs 15 thereof and moving said pawls to position out of engagement with the chain.

Having thus described my invention, what I claim and desire to secure by Letters Patent of the United States, therefor is—

1. An improved wire stretcher, comprising a lever, a chain gripping pawl thereon, an arm pivoted to the lever and also provided with a chain gripping device, a pulley, a chain secured to the lever at one end, then passed around the pulley, means for connecting the other end of said chain to a support and a wire gripping device connected with the pulley.

2. An improved wire stretcher, comprising a lever, a chain gripping pawl on the lever, an arm pivoted to the lever, a chain gripping pawl thereon, a pulley, a wire gripping device connected with the pulley, a chain connected with the lever at the point where the said arm is pivoted, said chain passed around said pulley and in engagement with both of said chain gripping pawls and having at one end a hook and a wire gripping device.

3. In a wire stretcher, the combination of a lever having extension sides at one end and shoulders formed on the inner faces of said sides, a chain gripping pawl pivoted between the ends of the extension sides and extended toward the body portion of the lever and a spring for holding the free end of the chain gripping pawl toward the body portion of the lever.

4. In a wire stretcher, the combination of a lever having extension sides at one end and shoulders formed on the inner faces of said sides, a chain gripping pawl pivoted between the ends of the extension sides and extended toward the body portion of the lever, a spring for holding the free end of the chain gripping pawl toward the body portion of the lever and a handle fixed to said chain gripping device.

5. A wire stretcher, comprising a lever, extension sides on one end of the lever, a chain gripping pawl pivoted between the outer ends of the extension sides and extended toward the body portion of the lever, a spring for holding the free end of said pawl in a direction toward the body portion of the lever, an arm pivoted to the lever and also having extension sides and a pawl pivoted between said sides, a pulley, a wire gripping device attached to the pulley, a chain connected with the said lever and arm at the pivot point of the arm, said chain passed around said pulleys and between the extension sides of the lever and arm and provided on one end with a hook and a wire gripping device.

JOHN R. HAMILTON.

Witnesses:
J. W. FLEMING,
J. B. WILLIAMSON.